Patented June 23, 1936

2,044,969

UNITED STATES PATENT OFFICE 2,044,969

MOLDING MIXTURES AND THEIR MANUFACTURE

Lawrence C. Byck, Elizabeth, N. J., assignor to Bakelite Corporation, New York, N. Y., a corporation of Delaware No Drawing. Original application September 27, 1922, Serial No. 590,943. Divided and this application November 5, 1932, Serial No. 641,489

12 Claims. (Cl. 106—22)

It is common practice in the manufacture of phenolic condensation products of the infusible type to incorporate with the material to be transformed certain organic addition agents which are capable of remaining in solid solution in the infusible end product and of imparting thereto an increased plasticity, particularly at elevated temperatures; see for example U. S. Patents to L. H. Baekeland, Nos. 1,133,083, 1,259,472, etc. According to the present invention on the contrary, I incorporate with such phenolic condensation products, or the raw materials therefor at an appropriate stage of their manufacture, an organic addition agent which, while serving to increase the fusibility and plasticity of the material while it is yet in the soluble and fusible (potentially reactive) stage, will nevertheless not substantially increase, and may even definitely decrease, the thermo-plasticity of the infusible end product. The effect of the additions contemplated herein, is, so far as I am aware unique in that they do not materially lower the temperature at which the end product undergoes a definite deformation under a definite load; and they may actually increase the temperature at which such deformation occurs. The addition materials used in accordance with this invention are, therefore, positive plasticizing agents for the phenolic condensation product while the latter is still in the fusible and soluble stage, but are substantially neutral or negative as regards plasticizing the material after it has been transformed to the infusible condition.

My invention contemplates further a phenolic condensation product of the so-called permanently fusible and soluble type (Novolak, phenol resin, saliretin resin, etc.) in admixture or solid solution with an organic addition agent of the character above described. My invention also includes the process involved in the preparation of such modified phenolic condensation products whether of the fusible or infusible type. This process in so far as it relates to phenolic condensation products of the infusible type, is preferably carried out in at least two steps or stages in accordance with the general methods disclosed and claimed in U. S. Patent 1,038,475, patented September 10, 1912 to L. H. Baekeland, the first step involving the preparation of a novel condensation product of the Novolak or so-called permanently fusible and soluble type, containing an organic addition of the nature described above; this Novolak being in the second or final stage of the process converted by formaldehyde, paraform, hexamethylenetetramine or other appropriate methylene-containing body (hereinafter referred to as a hardening agent) into the desired infusible product.

Organic addition agents suitable for use in accordance with this invention may be prepared in a variety of ways and from a variety of raw materials, among which I prefer the vegetable oils. While my invention is not limited thereto, I now prefer to use tung-oil, modified and rendered soluble in phenolic condensation products by treatment in presence of phenol with very small proportions of certain reagents, which for convenience I will term "converting agents". The nature of the chemical or physical change undergone by the oil in presence of these agents employed in these small proportions and under these conditions is not definitely known, but as stated above one effect of the treatment carried out in the manner hereinafter described, is to render the treated oil much more freely soluble in phenolic condensation products, and to reduce the tendency which is strongly marked in untreated oils to separate therefrom as the infusible stage is approached or reached. Accordingly I will hereinafter refer briefly to the treated oil as "converted oil". The infusible stage mentioned above is approached through a process of polymerization, and it is well-known in this art that at the moment of polymerization the tendency to expel all extraneous matters is very pronounced; it is a peculiar and valuable characteristic of the converted oils, prepared as described herein, that they are not expelled but on the contrary are strongly retained in the infusible polymerized product.

I will now describe my invention by reference to a preferred embodiment thereof, it being understood that the invention is not restricted to the particular manipulative methods described by way of example, nor to any particular proportions in which the converted oil is used. In respect to such proportions it will of course be understood that these will necessarily be varied in accordance with the particular results sought, such for example as the flowing, penetrating and impregnating qualities to be imparted to the condensation product.

I first prepare a mixture of a suitable phenolic body such as phenol or cresol, the vegetable oil, such as tung oil, and the converting agent; appropriate proportions for most purposes being about 20 to 30 parts by weight of tung-oil to 100 parts of phenol, the converting agent being introduced in very small proportions, usually less than 1% and seldom or never exceeding 3% by weight of the phenol. In the case of certain converting agents which exhibit a strong tendency to gelatinize tung-oil, as aluminum chlorid, concentrated sulfuric acid and hydrochloric acid, it is important that the agent be first mixed with or dissolved in the phenol, and the oil added to the mixture. With other converting agents the order of mixing is not material.

Among the converting agents which I have found suited for the purposes of this invention I may mention anhydrous aluminum chlorid, sulfur chlorid, sulfur, antimony sulfids, anhydrous hydrochloric acid, phosphoric acid and anhydrid, concentrated sulfuric acid, oxalic acid, pyrogallol and acetic anhydrid. Many other substances both inorganic and organic, are capable of the same or similar action. It is essential for the best results that the proportion of the converting agent should be kept as small as practicable, having in view the avoidance of any necessity for washing the condensation product at a later manufacturing stage, whereby free phenol would necessarily be eliminated and the proper reacting proportions disturbed. Satisfactory proportions in a specific case are:

| | Parts by weight |
|---|---|
| Phenol | 100 |
| Anhydrous AlCl₃ | 0.5 |
| Tung-oil | 25 |

In case the converting agent used is aluminum chlorid, sulfur chlorid, or concentrated surfuric acid, it is sufficient to stir the mixture well and to permit the exothermic reaction to proceed until the self-heating ceases, after which the mixture is permitted to cool. With the other converting agents mentioned the reaction is somewhat slower and the mixture is preferably boiled under a reflux condenser. When the operation is properly carried out the product is a homogeneous liquid which may, however, partially solidify or crystallize on cooling in case relatively low proportions of tung oil have been used. In this case it may be rendered permanently liquid by the addition of small proportions, say about 10% of water. As a result of the foregoing treatment the tung oil appears to enter in large part at least into combination with the phenol, the term "combinaton" being used in its broad sense to indicate some physical, chemical or physico-chemical association or union whereby the composition loses the characteristic odor of the oil, undergoing at the same time a decided color change, and acquiring new properties and characteristics. The nature of this combination or union has not as yet been determined.

To the mixture prepared as above to which for convenience and clearness I will refer hereinafter as "phenol-oil composition" I add formaldehyde or its equivalents (hexamethylenetetramine, etc.), either in anhydrous condition or in aqueous solution, and in proportion to yield with the phenol a resinous condensation product of the Novolak or permanently fusible type. For this purpose I may add about 60–65 parts of 40% formaldehyde solution for each 100 parts of phenol in the mixture. I may also introduce at this stage an appropriate condensing agent, such for instance as hydrochloric acid, which serves to accelerate the condensation. The mixture is then heated to complete the condensation, after which the temperature is raised sufficiently to drive off any water which may be present and to render the product anhydrous. It is sometimes desirable at this stage to blow steam through the resin in order to facilitate the elimination of volatile impurities, including a part or all of the free phenol.

As compared with a phenol resin (Novolak) prepared as above but without the converted oil addition, the product of the above operation is decidedly more plastic at ordinary temperatures, and especially when slightly warm; it has also a distinctly lower melting point, and much better penetrating and impregnating qualities; and if properly made will flow slowly at summer temperature and quite rapidly at the temperature of boiling water. It does not become infusible under prolonged heating at the temperature of the vapors of boiling naphthalene.

This permanently fusible soluble resin, hereafter termed the "non-reactive phenol-oil-methylene resin" may be used as such for certain purposes. It is utilizable for instance in conjunction with alcohol or other appropriate solvents or solvent mixtures as a varnish; and it may likewise be incorporated with wood flour or other suitable filling materials and used for molding purposes. It should be mentioned, however, that in this fusible condition it lacks the strength and hardness which is characteristic of the phenolic condensation products of the infusible type, and moreover its solubility and fusibility greatly restrict its application in the arts.

In order to transform the non-reactive phenol-oil-methylene resin prepared as above into a material of the highest strength and heat-resisting quality, generally adapted for the manifold uses for which such compounds are now employed in the arts, it should be mixed in known manner with a compound containing an active methylene-group, such for instance as paraform or hexamethylenetetramine, and heated for a sufficient time and at a sufficient temperature to effect the conversion. For this purpose I may incorporate with the resin 8 to 10% of hexamethylenetetramine, or an equivalent proportion of any other compound having a reactive methylene group. The general conditions for effecting transformations of this nature are now well understood in this art.

After the admixture of these reactive methylene-containing substances with the non-reactive resin, and before the heating has been carried so far as to render the mass insoluble and infusible, the product is a potentially reactive composition which can be dissolved in suitable organic solvents or mixtures thereof, as for example alcohol, acetone, hydrocarbons, esters, etc. Such solutions serve as varnishes, lacquers, impregnating solutions, and may be applied for many purposes now well understood in this art. Alternatively the solutions may be prepared by first dissolving the fusible resin in the solvent, and then adding thereto the compound possessing the reactive methylene-group. Solutions prepared in either of these ways have been found to be well suited for the manufacture of so-called composite cardboard (U. S. Patent 1,019,406 to L. H. Baekeland), comprising sheets of paper, canvas, etc. coated or impregnated with the phenolic condensation product, and consolidated and transformed by sufficient application of heat.

Similarly the potentially reactive composition prepared as above may be incorporated with wood flour or other suitable filling materials and compounded into molding mixtures, to be shaped and hardened or transformed in the manner now well understood in this art.

It is characteristic of the potentially reactive compositions prepared as above that they possess a very high degree of plasticity, and are very readily and perfectly absorbed by wood fiber, yielding therewith a highly plastic and homogeneous molding mixture. These mixtures when containing moisture or prepared with undried wood-flour are very readily dried without losing their desirable flowing qualities, with the result that any water present can be easily eliminated without the mixture losing the plasticity which is necessary for good molding.

The potentially reactive compositions containing the converted oil are rendered infusible and attain their maximum strength in substantially the same time and under substantially the same conditions as similar products prepared without the converted oil, but the infusible products prepared from the first-mentioned compositions have been found to be as a rule actually less thermoplastic than those which contain no converted oil. That is to say, the end products containing the converted oil require as a rule a distinctly higher temperature to bring about a definite distortion under a definite load.

The foregoing characteristics are associated with other properties which the compositions of this invention or articles made from them are found to possess. Among these are increased resistivity to overcuring, that is, overheating in the mold is not accompanied by a proportionate distortion or defective surface condition such as follow from overheating compositions having no fatty oil ingredient. Then again the compositions of this invention show an increased elasticity which is indicated by an absence of a tendency to crack when molded about inserts, and also by the fact that molded articles can be sprung while hot from a threaded mold; this property avoids the necessity of unscrewing threaded articles, such as bottle caps, from the mold.

As stated above, my invention is not limited to the particular manner described above of compounding the materials. For example the oil may be first treated with phenol in the presence of the converting agent in properly limited proportion and then incorporated with phenol or with fusible and soluble condensation products. However the thickening of the oil under the action of the converting agent even when using the very small proportions of converting agent contemplated herein, is apt to render difficult its subsequent incorporation into a thoroughly homogeneous composition and the particular operating method which I have described above is therefore preferred.

Also while I now prefer to use tung-oil, other vegetable oils, for example rapeseed oil, may wholly or partly replace it.

The expression "potentially reactive composition" is used herein to designate such compositions containing phenolic condensation products as are initially fusible and soluble, but are transformable under the action of heat or of heat and pressure into an infusible final product. The expression "non-reactive phenol resin" is used herein to designate such phenolic condensation products as retain their fusible and soluble character even after prolonged heating to temperatures exceeding their melting point.

This application is a division of the copending application Serial No. 590,943 filed September 27, 1922 for Phenolic condensation products and process of making same.

I claim:

1. A potentially reactive phenolic molding mixture containing a filling material and an absorbed condensation product of a phenol and an aldehyde, and an organic vegetable oil component acting as a positive plasticizing agent for the mass, said component being substantially free from plasticizing effect upon the infusible final product.

2. Potentially reactive molding mixture comprising a filler and a binder absorbed by said filler of a heat-hardenable reaction product of a phenol, a fatty oil and an agent having a mobile methylene group, said mixture when molded under the combined action of heat and pressure yielding an article characterized by elasticity and resistance to overcuring.

3. Potentially reactive molding mixture comprising a filler and a binder for said filler of a heat-hardenable reaction product of a phenol and a fatty oil and further reacted with an agent having a mobile methylene group, said mixture when molded under the combined action of heat and pressure yielding an article characterized by elasticity and resistance to overcuring.

4. Moldable composition characterized by plasticity and flow at ordinary temperatures but transformable under the action of heat and pressure to yield molded products of comparative non-thermoplastic nature, resistivity to overcuring and elasticity, and comprising a fibrous filler and a heat-hardening binder therefor of a resinous product obtained in the reaction of a phenol with a fatty oil and the addition of a methylene-containing agent.

5. Moldable composition characterized by plasticity and flow at ordinary temperatures but transformable under the action of heat and pressure to yield molded products of comparative non-thermoplastic nature, resistivity to overcuring and elasticity, and comprising a fibrous filler and a heat-hardening binder therefor of a resinous product obtained in the reaction of a phenol with a tung oil and the addition of a methylene-containing agent.

6. Process of preparing a moldable composition which comprises reacting a phenol with a fatty oil and an agent having a mobile methylene group to form a resinous product characterized by plasticity and flow at ordinary temperatures, and incorporating therewith a filler and a hardening agent to yield a heat-hardening composition.

7. A heat and pressure molded composition comprising a filling material and an absorbed binder comprising a phenol-aldehyde condensation product with a fatty oil acting as a positive plasticizing agent for the mass during molding but substantially free from plasticizing effect upon the infusible phenol product, said product being characterized by elasticity and freedom from over-cure.

8. A heat and pressure molded composition comprising a filling material and an absorbed binder comprising a reaction product of a phenol and a fatty oil reacted with an agent having a mobile methylene group, said composition being characterized by elasticity and freedom from over-curing.

9. A potentially reactive phenolic molding composition containing a filling material and absorbed in the filler a condensation product of a phenol and an aldehyde, and a vegetable oil component in minor proportions acting as a positive plasticizing agent for the fusible mass, said component in such proportion being substantially free from plasticizing effect upon the cold infusible final product but active to prevent surface imperfections.

10. Process of preparing a molding composition which comprises reacting a phenol with a fatty oil and an agent having a mobile methylene group to form a resinous product characterized by plasticity and flow at ordinary temperatures, incorporating therewith a hardening agent to yield a heat-hardening composition, dissolving the composition in a solvent, and absorbing the composition in a filler.

11. Process of preparing a molding composition which comprises reacting a phenol with a fatty oil and an agent having a mobile methylene group to form a resinous product characterized by plasticity and flow at ordinary temperatures, incorporating therewith a hardening agent to yield a heat-hardening composition, reacting the mass just short of the infusible and insoluble stage, dissolving the composition in a solvent, and absorbing the composition in a filler.

12. A potentially reactive phenolic molding composition containing a filling material and a non-reactive condensation product of a phenol and a vegetable oil and an aldehyde and characterized by plasticity and flow at ordinary temperatures, and a methylene-containing hardening agent therefor, said mixture having the characteristics of moldability under heat and pressure to yield products of a non-thermoplastic nature when cold but sufficiently plastic at the end of the molding operation to permit stripping threaded articles from a threaded mold.

LAWRENCE C. BYCK.